US012621104B2

(12) United States Patent
Tamrakar et al.

(10) Patent No.: US 12,621,104 B2
(45) Date of Patent: May 5, 2026

(54) SOUNDING REFERENCE SIGNAL CONFIGURATION METHOD, TERMINAL AND NETWORK-SIDE DEVICE

(71) Applicant: VIVO MOBILE COMMUNICATION CO., LTD., Dongguan (CN)

(72) Inventors: Rakesh Tamrakar, Dongguan (CN); Peng Sun, Dongguan (CN); Yuan Shi, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 452 days.

(21) Appl. No.: 18/191,654

(22) Filed: Mar. 28, 2023

(65) Prior Publication Data

US 2023/0246784 A1     Aug. 3, 2023

Related U.S. Application Data

(63) Continuation of application No. PCT/CN2021/120822, filed on Sep. 27, 2021.

(30) Foreign Application Priority Data

Sep. 29, 2020     (CN) .......................... 202011051186.5

(51) Int. Cl.
*H04W 16/28*         (2009.01)
*H04L 5/00*          (2006.01)

(52) U.S. Cl.
CPC .......... *H04L 5/0051* (2013.01); *H04L 5/0012* (2013.01); *H04W 16/28* (2013.01)

(58) Field of Classification Search
CPC ..... H04L 5/0051; H04L 5/0012; H04W 16/28
See application file for complete search history.

(56) References Cited

U.S. PATENT DOCUMENTS

| | | | |
|---|---|---|---|
| 10,666,408 B2 | 5/2020 | Shin et al. | |
| 10,841,059 B2 | 11/2020 | Park et al. | |
| 10,952,231 B2 * | 3/2021 | Liou ..................... | H04W 72/23 |
| 11,102,783 B2 | 8/2021 | Stirling-Gallacher et al. | |

(Continued)

FOREIGN PATENT DOCUMENTS

| | | |
|---|---|---|
| CN | 109802810 A | 5/2019 |
| CN | 109923828 A | 6/2019 |

(Continued)

OTHER PUBLICATIONS

Intel Corporation, "Resolution of Remaining Opens for NR Positioning UL PRS Design", 3GPP TSG RAN WG1 Meeting #99, Reno, US, Nov. 18-22, 2019, R1-1912229.

(Continued)

*Primary Examiner* — Fahmida S Chowdhury
(74) *Attorney, Agent, or Firm* — The Webb Law Firm

(57)     ABSTRACT

A sounding reference signal configuration method includes indicating, by a network-side device to a terminal, a configuration parameter of a target SRS; where in a case that an SRS resource indicated by the configuration parameter includes N OFDM symbols and the configuration parameter indicates that frequency hopping of the target SRS is disabled, the configuration parameter indicates the terminal to use at least one spatial beam to transmit the target SRS on the N OFDM symbols, where N is an integer greater than 1.

20 Claims, 8 Drawing Sheets

300

S310

A terminal receives a configuration parameter of a target SRS

S312

The terminal transmits the target SRS by using at least one spacial beam on N OFDM symbols

(56) References Cited

U.S. PATENT DOCUMENTS

| 2014/0241242 A1 | 8/2014 | Josiam et al. |
| 2019/0174466 A1* | 6/2019 | Zhang .................. H04L 5/0057 |
| 2019/0281588 A1* | 9/2019 | Zhang .................. H04W 52/08 |
| 2019/0297603 A1* | 9/2019 | Guo ...................... H04L 5/0051 |
| 2019/0349964 A1* | 11/2019 | Liou ................... H04W 72/046 |
| 2019/0372734 A1 | 12/2019 | Choi et al. |
| 2020/0092055 A1* | 3/2020 | Choi ...................... H04L 5/005 |
| 2020/0204316 A1* | 6/2020 | Zhang .................. H04L 5/0051 |
| 2020/0228190 A1* | 7/2020 | Cirik .................... H04L 5/0048 |
| 2020/0267712 A1* | 8/2020 | Cirik .................... H04L 5/0023 |
| 2020/0322957 A1* | 10/2020 | Tomeba ............ H04W 72/0453 |
| 2020/0351129 A1* | 11/2020 | Kwak .................. H04W 76/27 |
| 2020/0374071 A1* | 11/2020 | Wang ...................... H04B 1/713 |
| 2021/0051707 A1* | 2/2021 | Rastegardoost .... H04W 74/006 |
| 2021/0351960 A1 | 11/2021 | Huang et al. |
| 2022/0038233 A1* | 2/2022 | Kundu .................. H04L 5/0048 |
| 2022/0209908 A1* | 6/2022 | Qin .......................... H04J 11/00 |
| 2023/0246784 A1* | 8/2023 | Tamrakar .............. H04W 16/28 |
| | | 370/329 |

FOREIGN PATENT DOCUMENTS

| CN | 110838903 A | 2/2020 |
| CN | 110915283 A | 3/2020 |
| CN | 111295856 A | 6/2020 |
| IN | 202037024231 | 7/2020 |
| WO | 2019195528 A1 | 10/2019 |
| WO | 2020048332 A1 | 3/2020 |

OTHER PUBLICATIONS

Interdigital, Inc., "Remaining issues on beam management", 3GPP TSG RAN WG1 Meeting #93, Busan, KR, May 21-25, 2018, R1-1807014.

Nokia et al., "Views on UL reference signals for NR Positioning", 3GPP TSG RAN WG1 Meeting #98, Prague, CZ, Aug. 26-30, 2019, R1-1908347.

Nokia et al., "Potential Positioning Techniques—UL based solutions", 3GPP TSG RAN WG1 Meeting #96, Athens, Greece, Feb. 25-Mar. 1, 2019, R1-1901848.

VIVO, "Discussion on physical-layer procedures for UE/gNB measurements", 3GPP TSG RAN WG1 #98bis, Chongqing, China, Oct. 14-20, 2019, R1-1910240.

Nokia et al., "Remaining details on SRS design in NR", 3GPP TSG RAN WG1 Meeting AH 1801, R1-1800758, Jan. 22-26, 2018, Vancouver, Canada.

Nokia et al., "Views on UL reference signals for NR Positioning", 3GPP TSG RAN WG1 Meeting #99, R1-1912293, Nov. 18-22, 2019, Reno, NV.

Samsung, "Remaining details on SRS", 3GPP TSG RAN WG1 Meeting 91, R1-1720313, Nov. 27-Dec. 1, 2017, Reno, USA.

ZTE et al., "Details on UL beam management", 3GPP TSG RAN WG1 Meeting 90bis, R1-1717430, Oct. 9-13, 2017, Prague, CZ.

* cited by examiner

200

S210

A network-side device indicates a configuration parameter of a
target SRS to a terminal 300                                                                              S310
A terminal receives a configuration parameter of a target SRS
S312
The terminal transmits the target SRS by using at least one spacial beam on N OFDM symbols
FIG. 3
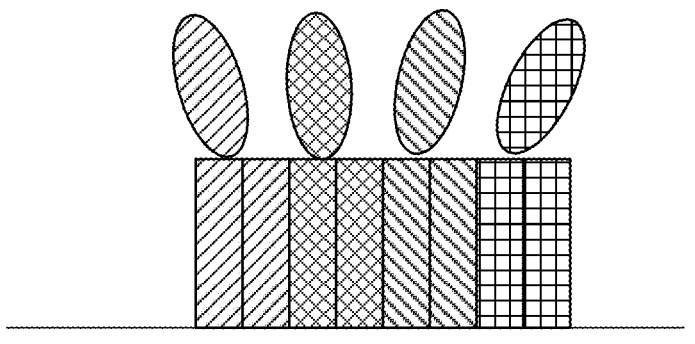
FIG. 4
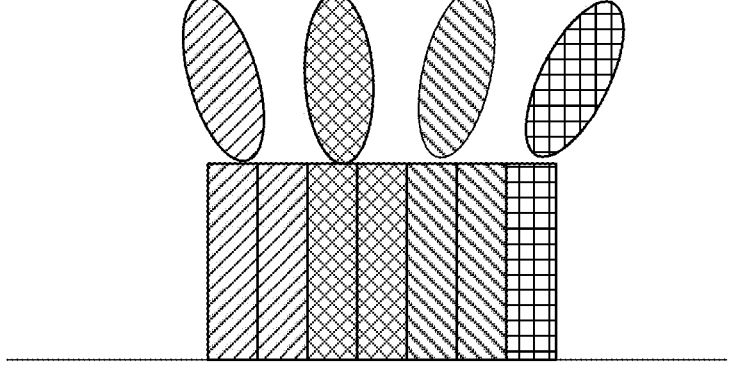
FIG. 5

First
transmission

Second
transmission

Triggered by
DCI

First
transmission

Second
transmission

...

...

Seventh
transmission

First
transmission

Second
transmission

...

Seventh
transmission

SOUNDING REFERENCE SIGNAL CONFIGURATION METHOD, TERMINAL AND NETWORK-SIDE DEVICE

CROSS-REFERENCE TO RELATED APPLICATIONS

This application is a Bypass Continuation Application of PCT/CN2021/120822 filed on Sep. 27, 2021, and claims priority to Chinese Patent Application No. 202011051186.5 filed on Sep. 29, 2020, the disclosures of which are hereby incorporated by reference in their entireties.

BACKGROUND OF THE INVENTION

Field of the Invention

This application pertains to the field of communications technologies, and specifically, relates to a sounding reference signal (SRS) configuration method, a terminal, and a network-side device.

Description of Related Art

In general, a network-side device can indicate SRS configuration parameters to a terminal (also referred to as a terminal device or user equipment (UE)) to control a specific behavior of the terminal in transmitting SRS. For semi-persistent SRS or aperiodic SRS, the network-side device can further trigger, by using trigger signaling, the UE to transmit SRS.

Semi-persistent SRS related parameters can be configured by higher layer signaling (for example, radio resource control (RRC) signaling), and the terminal can start to transmit semi-persistent SRS according to the SRS related parameters configured by RRC until the terminal receives a deactivation command from a base station. Aperiodic SRS related parameters are configured by RRC, and trigger, in downlink control information (DCI), the terminal to perform a single SRS transmission. RRC configuration parameters include a time domain parameter such as an SRS resource symbol position, the number of orthogonal frequency division multiplex (OFDM) symbols occupied, frequency hopping, and a repetition parameter R.

SUMMARY OF THE INVENTION

According to a first aspect, a sounding reference signal configuration method is provided, including: indicating, by a network-side device to a terminal, a configuration parameter of a target sounding reference signal SRS; where in a case that an SRS resource indicated by the configuration parameter includes N orthogonal frequency division multiplex OFDM symbols and the configuration parameter indicates that frequency hopping of the target SRS is disabled, the configuration parameter indicates the terminal to use at least one spatial beam to transmit the target SRS on the N OFDM symbols, where N is an integer greater than 1.

According to a second aspect, an SRS configuration apparatus is provided, including: a determining module, configured to determine a configuration parameter of a target SRS of a terminal; and a first transmit module, configured to indicate the configuration parameter of the target SRS to the terminal; where in a case that an SRS resource indicated by the configuration parameter includes N OFDM symbols and the configuration parameter indicates that frequency hopping of the target SRS is disabled, the configuration parameter indicates the terminal to use at least one spatial beam to transmit the target SRS on the N OFDM symbols, where N is an integer greater than 1.

According to a third aspect, an SRS transmit method is provided, including: receiving, by a terminal, a configuration parameter of a target SRS; and in a case that an SRS resource indicated by the configuration parameter includes N OFDM symbols, and that the configuration parameter indicates that frequency hopping of the target SRS is disabled, transmitting, by the terminal, the target SRS by using at least one spatial beam on the N OFDM symbols, where N is an integer greater than 1.

According to a fourth aspect, an SRS transmit apparatus is provided, including: a receive module, configured to receive a configuration parameter of a target SRS; and a second transmit module, configured to: in a case that an SRS resource indicated by the configuration parameter includes N OFDM symbols, and that the configuration parameter indicates that frequency hopping of the target SRS is disabled, transmit the target SRS by using at least one spatial beam on the N OFDM symbols, where N is an integer greater than 1.

According to a fifth aspect, a network-side device is provided, where the network-side device includes a processor, a memory, and a program or instructions stored in the memory and executable on the processor, and when the program or instructions are executed by the processor, steps of the method according to the first aspect are implemented.

According to a sixth aspect, a terminal is provided, where the terminal includes a processor, a memory, and a program or instructions stored in the memory and executable on the processor, and when the program or instructions are executed by the processor, steps of the method according to the third aspect are implemented.

According to a seventh aspect, a non-transitory readable storage medium is provided, where the non-transitory readable storage medium stores a program or instructions, and when the program or instructions are executed by a processor, steps of the method according to the first aspect are implemented, or the steps of the method according to the third aspect are implemented.

According to an eighth aspect, a chip is provided, where the chip includes a processor and a communication interface, the communication interface is coupled to the processor, and the processor is configured to execute a program or instructions of a network-side device to implement the method according to the first aspect, or the processor is configured to execute a program or instructions of a terminal to implement the method according to the third aspect.

According to a ninth aspect, a computer program product is provided, where the computer program product includes a processor, a memory, and a program or instructions stored in the memory and executable on the processor, and when the program or instructions are executed by the processor, steps of the method according to the first aspect are implemented, or steps of the method according to the third aspect are implemented.

BRIEF DESCRIPTION OF DRAWINGS

FIG. 3 is a schematic flowchart of an SRS transmit method according to an embodiment of this application;

FIG. 4 is a schematic diagram of transmitting a target SRS according to an embodiment of this application;

FIG. 5 is a schematic diagram of transmitting a target SRS according to an embodiment of this application;

DESCRIPTION OF THE INVENTION

Figure 1:
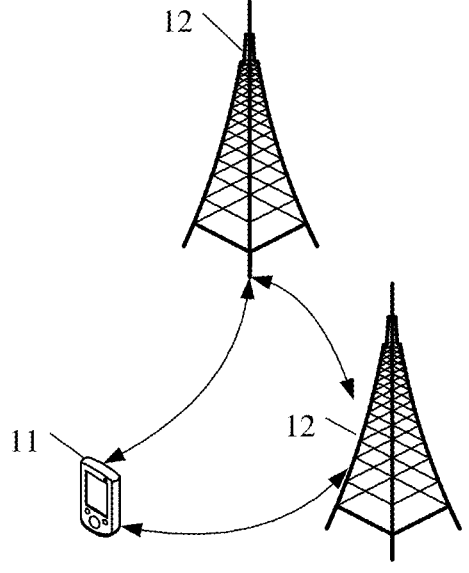
FIG. 1 is a block diagram of a wireless communication system to which embodiments of this application are applicable.

Currently, one SRS resource configured for SRS may occupy 1 or 2 or 4 symbols, and the repetition parameter R may be configured to 1 or 2 or 4. The repetition parameter R is used to indicate the number of SRS symbols transmitted at a time in a case that frequency hopping is configured. For example, one SRS resource occupies 4 OFDM symbols, the repetition parameter R=1, and SRS frequency hopping is enabled. Under this condition, in transmitting SRS in a frequency-hopping mode, the terminal transmits SRS on a first symbol of a subband, transmits SRS on a second symbol of another subband, then transmits SRS on a third symbol of still another subband, and then transmits SRS on a fourth symbol of yet another changed subband. In a case that R=2, subband changes every 2 symbols. In a case that R=4, SRS is transmitted on 4 symbols of a subband, and still transmitted on 4 symbols of another changed subband.

It can be learned that, at present, a spatial beam used for transmitting SRS is not taken into account when SRS parameters are configured.

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, objects distinguish by "first"

and "second" are usually of a same type, and the number of such objects is not limited. For example, a first object may be one object or a plurality of objects. In addition, in this specification and claims, "and/or" represents at least one of connected objects, and the character "/" generally represents an "or" relationship between the associated objects.

It should be noted that the technologies described in the embodiments of this application are not limited to long term evolution (LTE)/LTE-Advanced (LTE-A) systems, and may also be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably in the embodiments of this application. The technologies described may be used in the above-mentioned systems and radio technologies as well as other systems and radio technologies. However, in the following descriptions, a new radio (NR) system is described for an illustration purpose, NR terms are used in most of the following descriptions, and these technologies may also be applied to other applications than an NR system application, for example, a 6th generation (6G) communication system.

FIG. 1 is a block diagram of a wireless communication system to which embodiments of this application are applicable. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer or referred to as a notebook computer, a personal digital assistant (PDA), a palmtop computer, a netbook, an ultra-mobile personal computer (UMPC), a mobile internet device (MID), a wearable device, or vehicle user equipment, or pedestrian user equipment. The wearable device includes a bracelet, a headset, a pair of glasses, and the like. It should be noted that a specific type of the terminal 11 is not limited in the embodiments of this application. The network-side device 12 may be a base station or a core network. The base station may be referred to as a Node B, an evolved Node B, an access point, a base transceiver station (BTS), a radio base station, a radio transceiver, a basic service set (BSS), an extended service set (ESS), a Node B, an evolved Node B, a home NodeB, a home evolved NodeB, a WLAN access point, a Wi-Fi node, a transmitting receiving point (TRP), or another appropriate term in the art. Provided that a same technical effect is achieved, the base station is not limited to any specific technical term. It should be noted that in the embodiments of this application, the base station in the NR system is merely used as an example, and a specific type of the base station is not limited.

The following specifically describes the SRS configuration method provided in the embodiments of this application through specific embodiments and application scenarios thereof with reference to the accompanying drawings.

Figure 2:
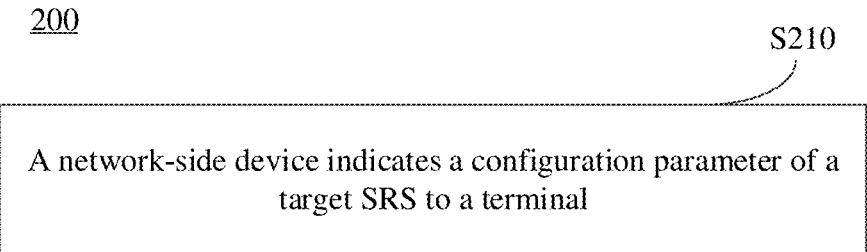
FIG. 2 is a schematic flowchart of an SRS configuration method according to an embodiment of this application.

FIG. 2 is a schematic flowchart of an SRS configuration method according to an embodiment of this application. The method 200 may be performed by a network-side device. In other words, the method may be performed by software or hardware installed on the network-side device. As shown in FIG. 2, the method may include the following steps.

S210. A network-side device indicates a configuration parameter of a target SRS to a terminal.

In a case that an SRS resource indicated by the configuration parameter includes N orthogonal frequency division multiplex OFDM symbols and the configuration parameter indicates that frequency hopping of the target SRS is disabled, the configuration parameter indicates the terminal to use at least one spatial beam to transmit the target SRS on the N OFDM symbols, where N is an integer greater than 1.

In this embodiment of this application, the network-side device configures a beam management SRS resource for a target SRS of the terminal, where the SRS resource occupies N symbols. In a case that N is an integer greater than 1, and that frequency hopping of the target SRS is configured to disable, it is indicated that the target SRS is transmitted by using at least one spatial beam in the SRS resource.

In a possible implementation, the target SRS includes one of the following: periodic SRS, semi-persistent SRS, or aperiodic SRS. In other words, the configured SRS resource may be periodic, semi-persistent, or aperiodic in time-domain characteristic.

In a possible implementation, in a case that a repetition parameter in the configuration parameter is configured to R, the configuration parameter indicates the terminal to use a same spatial beam on each R OFDM symbols of the N OFDM symbols to transmit the target SRS, wherein spatial beams used on every R OFDM symbols of the N OFDM symbols are different, and R is an integer greater than 0 and less than or equal to N.

In another possible implementation, in a case that a value of the repetition parameter is off, for example, it is prescribed in advance or specified in a protocol that when the SRS frequency hopping is configured to disable, the repetition parameter is off, it is indicated that R=n; or in a case that the configuration parameter does not include the repetition parameter, R=n; or it is prescribed in advance that the repetition parameter is configured to a value n. n is a predetermined value, and n is an integer greater than 0 and less than or equal to N; and optionally, n may be 1.

For example, the repetition parameter R in the configuration parameter may be configured to any value of 1 to N, for example, the value of R is n. Different values of R may indicate different information. For example, when R=1, the terminal uses a different beam on each OFDM symbol to transmit the target SRS, that is, using N different beams on the N OFDM symbols respectively to transmit the target SRS; or when R=2, the terminal uses a same beam on each two OFDM symbols and uses a different beam on every two OFDM symbols to transmit the target SRS, and by analogy, transmits the target SRS on N symbols, where symbol indexes of the two OFDM symbols may be continuous or discontinuous. The symbol indexes being continuous indicates continuous OFDM symbols in time domain.

By analogy, when R=N, the terminal uses a same beam on the N OFDM symbols to transmit the target SRS.

Alternatively, in another possible implementation, in a case that a repetition parameter in the configuration parameter is configured to be on, the configuration parameter indicates the terminal to use a same spatial beam on the N OFDM symbols to transmit the target SRS; or in a case that a repetition parameter in the configuration parameter is configured to be off, the configuration parameter indicates the terminal to use a different spatial beam on each OFDM symbol of the N OFDM symbols to transmit the target SRS. That is, in this possible implementation, in a case that the repetition parameter in the configuration parameter is configured to be on, the configuration parameter indicates the terminal to use a same spatial beam on the N OFDM symbols to transmit the target SRS; or in a case that the repetition parameter is configured to be off, the configuration parameter indicates the terminal to use a different spatial beam on each OFDM symbol of the N OFDM symbols separately to transmit the target SRS.

In a case that the target SRS is aperiodic SRS or semi-persistent SRS, the network-side device may transmit a trigger command for the target SRS to the terminal to trigger the terminal to transmit the target SRS. In this case, the network-side device may have the repetition parameter carried in the trigger command to transmit the repetition parameter to the terminal. Therefore, in a possible implementation, the method further includes: in a case that the target SRS is aperiodic SRS or semi-persistent SRS, transmitting a trigger command for the target SRS to the terminal, where the trigger command carries the repetition parameter.

In the possible implementation, optionally, the trigger command is used to trigger P transmissions of the target SRS, and for each transmission of the P transmissions of the target SRS, a spatial beam used for transmitting the target SRS on the N OFDM symbols is determined according to the repetition parameter, where P is an integer greater than 0. In this optional implementation, the trigger command may trigger multiple transmissions of the target SRS, where for each transmission, the spatial beam used for transmitting the target SRS on the N OFDM symbols is determined according to the repetition parameter. For details, reference may be made to the foregoing implementation indicated in the case of the repetition parameter being R. Details are not repeated herein.

For example, for aperiodic SRS, the trigger command is a command for triggering the terminal to transmit the aperiodic SRS. The network-side device may carry a repetition parameter R in the trigger command for the aperiodic SRS, and the terminal may determine, according to a value of R indicated in the trigger command, whether to use a same spatial beam or different spatial beams on the N OFDM symbols to transmit the target SRS. In addition, the trigger command for the aperiodic SRS may further trigger multiple SRS transmissions. For example, one piece of DCI signaling triggers P transmissions, and whether a same spatial beam is used for each transmission is determined according to a value of R.

For semi-persistent SRS, the trigger command is an activation command for activating the semi-persistent SRS configured for the terminal. The network-side device may carry a repetition parameter R in the activation command for the aperiodic SRS, and the terminal may determine, according to a value of R, whether to use a same spatial beam or different spatial beams on the N OFDM symbols to transmit the target SRS. In addition, the number of times of transmitting the target SRS may be carried in the activation command for the semi-persistent SRS, instructing the terminal to transmit the target SRS for M times after the target SRS is activated and then stops the transmission. In this way, for the semi-persistent SRS, the network-side device does not need to transmit a deactivation command to instruct the terminal to stop transmitting the target SRS, thereby reducing signaling overheads. In addition, a spatial beam for transmitting an SRS by the terminal may be flexibly configured by using a repetition parameter.

In a possible implementation, the configuration parameter further includes a start position of the N OFDM symbols in a slot. That is, the network-side device may configure a start position of the SRS resource in a slot.

The terminal may not expect a sum of the start position and N to be greater than 14, that is, a configured symbol length should not exceed an available symbol position length in the slot. Therefore, optionally, a sum of M and N is less than or equal to 14, and the start position is the M-th OFDM symbol in the slot.

Alternatively, in a possible implementation, cross-slot configuration may be supported, that is, the configured symbol length is allowed to be greater than the available symbol position length in the slot.

For example, the network-side device may configure multiple slot time domain positions for determining a position of a first slot and a position of at least one of rest slots. For a periodic resource and a semi-persistent SRS resource, multiple periodic slot offset parameters may be configured. In this case, it needs to be ensured that the SRS resources have a same period but different slot offsets. For an aperiodic SRS resource, multiple slot offsets may be configured in the aperiodic SRS resource; and an SRS resource set is configured with no slot offset or configured with a slot offset that is ineffective, or the SRS resource set is configured with one slot offset, and a slot time domain position of the resource needs to be determined according to a receive slot position of DCI for triggering the target SRS, a slot position of the SRS resource set, and a slot position of the SRS resource.

Alternatively, the network-side device may configure one slot time domain position for determining the first slot, and at least one of rest slot positions is obtained in a default manner, for example, a slot next to the first slot, or the x-th slot, where x is predefined.

Alternatively, the network-side device may configure one slot time domain position for determining the first slot, and configure at least one slot offset for indicating a slot difference between slots.

Alternatively, the network-side device may configure one slot time domain position for determining the first slot, and configure at least one symbol offset for indicating a symbol difference between slots.

In a possible implementation, the number of spatial beams associated with the SRS resource is $m=\lfloor N/R \rfloor$. In other words, in this possible implementation, the quantity of spatial beam information associated with the SRS resource is equal to N/R or round up (N/R) or equal to N. The network-side device may configure the quantity of spatial beam information associated with an SRS resource and a value of a repetition parameter, as appropriate to specific needs. For example, in a case that the quantity of spatial beam information associated with the SRS resource is equal to N, the repetition parameter R=1, or the repetition parameter is off or equal to 1 by default.

In a possible implementation, the network-side device may indicate, by using signaling, uplink spatial beam information selected for the SRS resource. For example, the uplink spatial beam information selected for the SRS resource may be indicated by an SRS resource indication field in DCI signaling.

In the possible implementation, the uplink spatial beam information indicated by the network-side device may be spatial relation information, or may be a transmission configuration indication (TCI), or may be identifier information of the spatial beam. This is not specifically limited in this embodiment of this application.

According to the technical solutions provided in the embodiments of this application, in a case that the frequency hopping of the target SRS is disabled, the repetition parameter in the configuration parameter of the target SRS can be used for triggering the terminal to transmit the target SRS by using at least one spatial beam on the SRS resource, so that control signaling overheads and a delay can be reduced. In addition, the activation command for the semi-persistent SRS being configured with a quantity of transmissions of the target SRS can further reduce signaling overheads and the repetition parameter enables flexible configuration of SRS transmit beams.

FIG. 3 is a schematic flowchart of an SRS transmit method according to an embodiment of this application. The method 300 may be performed by a terminal. In other words, the method may be performed by software or hardware installed on the terminal. As shown in FIG. 3, the method may include the following steps.

S310. A terminal receives a configuration parameter of a target SRS.

A network-side device may transmit, according to the manner described in the method 200, the configuration parameter of the target SRS to the terminal. For the specific implementation, refer to the description in the method 200. Details are not repeated herein.

S312. In a case that an SRS resource indicated by the configuration parameter includes N OFDM symbols, and that the configuration parameter indicates that frequency hopping of the target SRS is disabled, the terminal transmits the target SRS by using at least one spatial beam on the N OFDM symbols, where N is an integer greater than 1.

In this embodiment of this application, in correspondence with the method 200, when the terminal receives the configuration parameter of the target SRS that is transmitted by the network-side device using the method 200, in a case that an SRS resource indicated by the configuration parameter includes N OFDM symbols, and that the configuration parameter indicates that frequency hopping of the target SRS is disabled, the terminal transmits the target SRS by using at least one spatial beam on the N OFDM symbols.

In this embodiment of this application, the target SRS may be periodic SRS, semi-persistent SRS, or aperiodic SRS.

In a possible implementation, in a case that a repetition parameter in the configuration parameter is R, the terminal uses a same spatial beam on each R OFDM symbols of the N OFDM symbols to transmit the target SRS, wherein spatial beams used on every R OFDM symbols of the N OFDM symbols are different, and R is an integer greater than 0 and less than or equal to N. For example, in a case that a quantity of OFDM symbols occupied by the SRS resource of the target SRS configured in the configuration parameter is N=8, and the repetition parameter R=2, as shown in FIG. 4, the terminal uses a beam 1 on symbols 1 and 2, uses a beam 2 on symbols 3 and 4, uses a beam 3 on symbols 5 and 6, and uses a beam 4 on symbols 7 and 8 to transmit the target SRS.

In this possible implementation, in a case that N is not divisible by R, the number of last transmit symbols is less than R. For example, in FIG. 5, N=7 and R=2, and the terminal uses beam 1 on symbols 1 and 2, uses beam 2 on symbols 3 and 4, uses beam 3 on symbols 5 and 6, and uses beam 4 on symbol 7 to transmit the target SRS.

Figure 6:
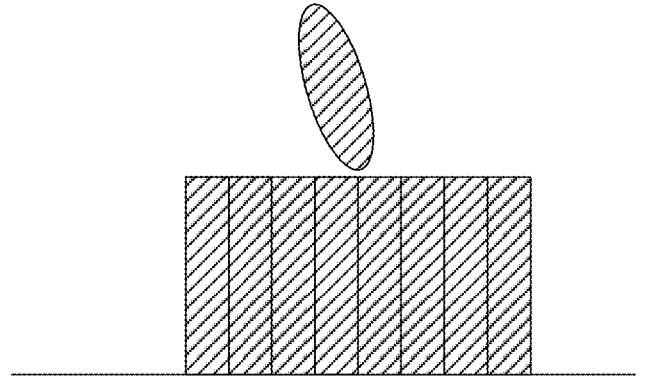
FIG. 6 is a schematic diagram of transmitting a target SRS according to an embodiment of this application.

In a case that R=N, the terminal uses a same spatial beam on N symbols to transmit the target SRS. For example, in FIG. 6, N=8 and R=8, and the terminal uses beam 1 on symbols 1 to 8 to transmit the target SRS.

In a possible implementation, in a case that a repetition parameter in the configuration parameter is configured to be on, the terminal uses a same spatial beam on the N OFDM symbols to transmit the target SRS. For example, assuming N=4, the terminal uses beam 1 on symbols 1 to 4 to transmit the target SRS. Alternatively, in a case that the repetition parameter in the configuration parameter is configured to off, the terminal uses a different spatial beam on each OFDM symbol of the N OFDM symbols to transmit the target SRS. For example, assuming N=4, the terminal uses beam 1 on symbol 1, uses beam 2 on symbol 2, uses beam 3 on symbol 4, and uses beam 4 on symbol 4 to transmit the target SRS.

In another possible implementation, in a case that a value of the repetition parameter is off, or that the configuration parameter does not include the repetition parameter, R=n, where n is a predetermined value, and n is an integer greater than 0 and less than or equal to N. n may be 1 or may be another predetermined number. The terminal may use a same spatial beam on each n OFDM symbols of the N OFDM symbols and use a different beam on every n OFDM symbols of the N OFDM symbols to transmit the target SRS.

In a possible implementation, in a case that the target SRS is aperiodic SRS or semi-persistent SRS, the terminal receives a trigger command for the target SRS, where the trigger command carries the repetition parameter. In a case that the target SRS is semi-persistent SRS, the trigger command may be an activation command for activating configuration for the target SRS; and in a case the target SRS is aperiodic SRS, the trigger command may be a trigger command for triggering the terminal to transmit the target SRS.

Optionally, the trigger command is used to trigger P transmissions of the target SRS, and for each transmission of the P transmissions of the target SRS, the terminal determines, according to the repetition parameter, a spatial beam used for transmitting the target SRS on the N OFDM symbols, where P is an integer greater than 0.

Figure 7:
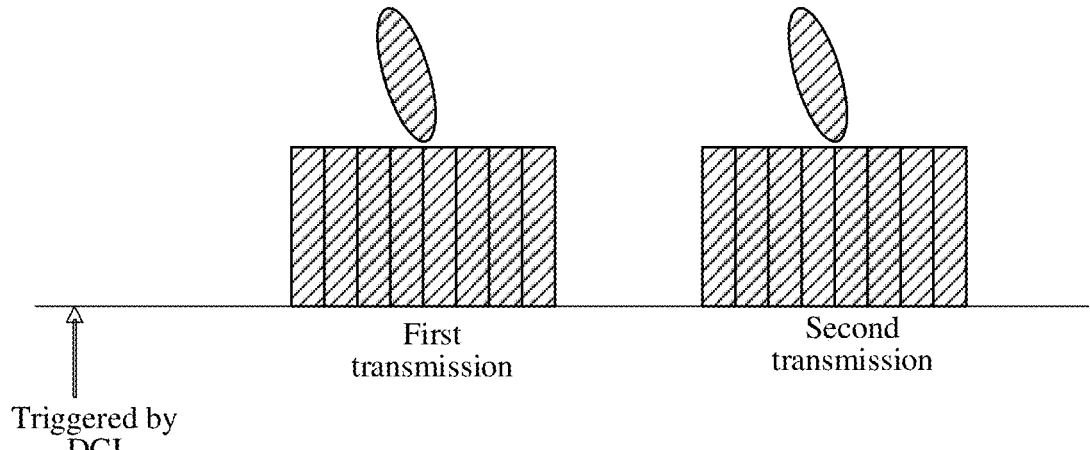
FIG. 7 is a schematic diagram of transmitting a target SRS according to an embodiment of this application.

For example, the target SRS is aperiodic SRS, the trigger command triggers P=2 transmissions of the target SRS, in the configuration parameters of the target SRS configured by RRC, N=8, that is, a quantity of symbols occupied by an SRS resource of the target SRS is 8, and the repetition parameter R=8. In this case, as shown in FIG. 7, the terminal uses a same spatial beam in two transmissions of the target SRS, transmitting 8 symbols each time.

Figure 8:
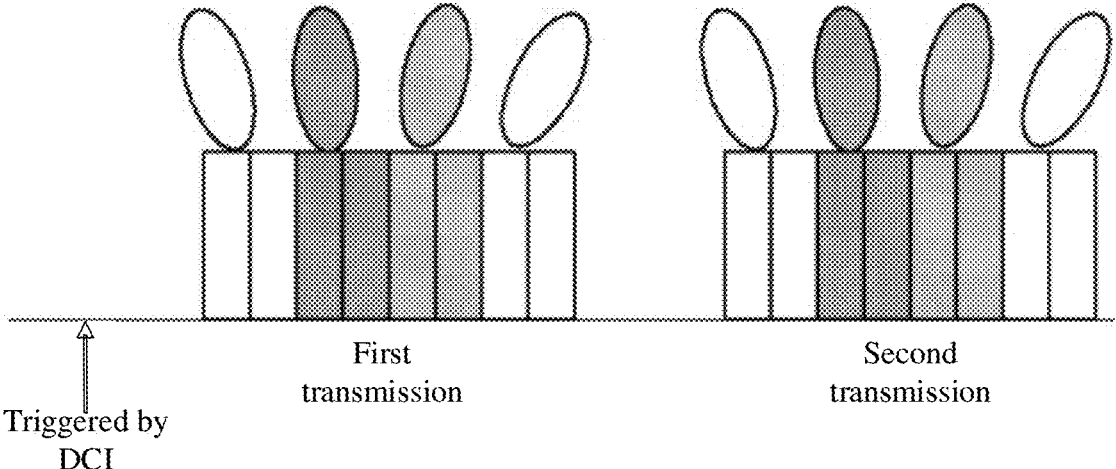
FIG. 8 is a schematic diagram of transmitting a target SRS according to an embodiment of this application.

For another example, the target SRS is aperiodic SRS, the trigger command triggers P=2 transmissions of the target SRS, in the configuration parameter of the target SRS configured by RRC, N=8, that is, a quantity of symbols occupied by an SRS resource of the target SRS is 8, and the repetition parameter R=2. In this case, as shown in FIG. 8, the terminal transmits the target SRS twice by using a different spatial beam on every two symbols, where the first transmission and the second transmission have a same symbol order and a same beam order.

Figure 9:
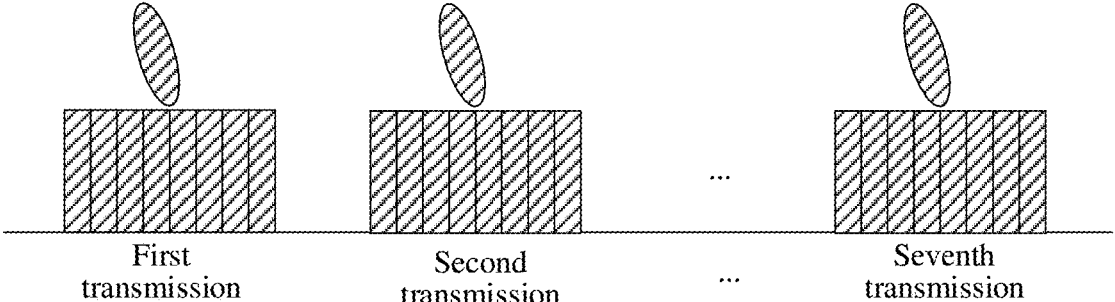
FIG. 9 is a schematic diagram of transmitting a target SRS according to an embodiment of this application.

For another example, the target SRS is semi-persistent SRS, the parameter carried in the activation command for the target SRS is R=8, and in the configuration parameter of the target SRS configured by RRC, N=8, the terminal is instructed to occupy all symbols (N=8) on the SRS resource and use a same beam to transmit the target SRS. In addition, in a case that the repetition parameter carried in the activation command is R=7, as shown in FIG. 9, the terminal transmits the target SRS for 7 times after the target SRS is activated and then stops the transmission, and the network-side device does not need to transmit a deactivation command.

Figure 10:
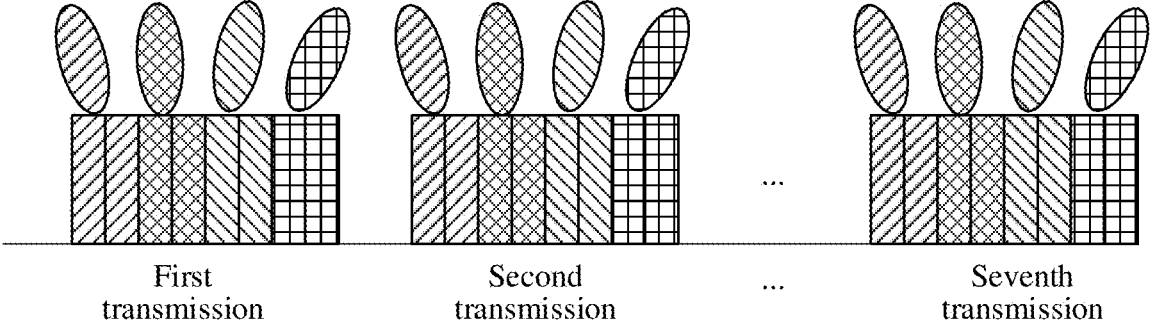
FIG. 10 is a schematic diagram of transmitting a target SRS according to an embodiment of this application.

For another example, the target SRS is semi-persistent SRS, the parameter carried in the activation command for the target SRS is R=2, instructing the terminal to use a different beam on every two symbols to transmit the target SRS, in the configuration parameter of the target SRS configured by RRC, N=8, and the repetition parameter carried in the activation command is R=7. In this case, as shown in FIG. 10, the terminal transmits the target SRS for 7 times after the target SRS is activated and then stops the transmission, and the network-side device does not need to transmit a deactivation command.

In a possible implementation, the configuration parameter further includes a start position of the N OFDM symbols in a slot. The start position is used for indicating a start OFDM symbol of the N OFDM symbols in the slot.

In a possible implementation, a sum of M and N is less than or equal to 14, and the start position is the M-th OFDM symbol in the slot.

In a possible implementation, the number of spatial beams associated with the SRS resource is $m=\lfloor N/R \rfloor$.

In a possible implementation, in S312, that the terminal transmits the target SRS by using at least one spatial beam on the N OFDM symbols includes:

the terminal receives downlink signaling, where the downlink signaling indicates uplink spatial beam information selected for the SRS resource; and the terminal determines, based on the uplink spatial beam information, a spatial beam used for transmitting the target SRS, and transmits the target SRS by using the spatial beam.

Optionally, the downlink signaling includes DCI signaling, and an SRS resource indication field in the DCI signaling indicates the uplink spatial beam information selected for the SRS resource.

Optionally, the uplink spatial beam information includes one of the following: spatial relation information, TCI, or identifier information of the spatial beam.

It should be noted that the SRS configuration method provided in the embodiments of this application may be performed by an SRS configuration apparatus or a control module for performing the SRS configuration method in the SRS configuration apparatus. The embodiments of this application use the SRS configuration apparatus performing the SRS configuration method as an example to describe the SRS configuration apparatus provided in the embodiments of this application.

Figure 11:
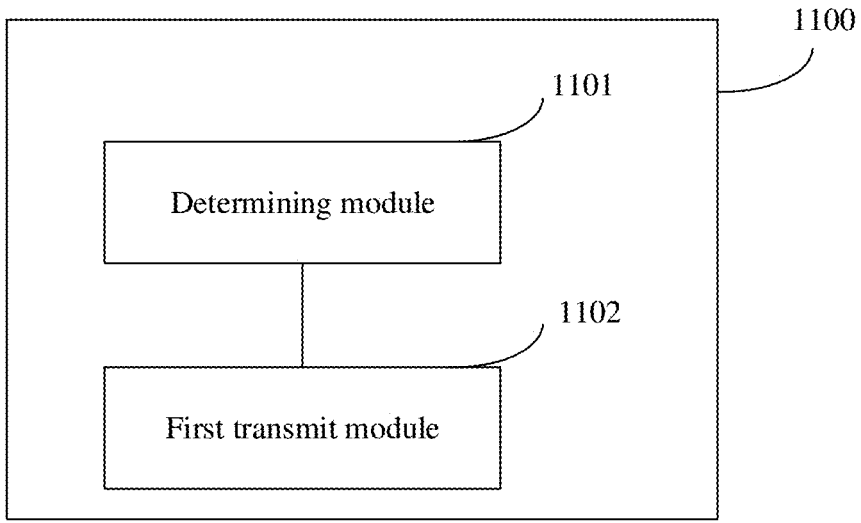
FIG. 11 is a schematic structural diagram of an SRS configuration apparatus according to an embodiment of this application.

FIG. 11 is a schematic structural diagram of an SRS configuration apparatus according to an embodiment of this application. As shown in FIG. 11, the apparatus 1100 may include a determining module 1101 and a first transmit module 1102.

In this embodiment of this application, the determining module 1101 is configured to determine a configuration parameter of a target SRS of a terminal; and the first transmit module 1102 is configured to indicate the configuration parameter of the target SRS to the terminal; where in a case that an SRS resource indicated by the configuration parameter includes N OFDM symbols, and that the configuration parameter indicates that frequency hopping of the target SRS is disabled, the configuration parameter indicates the terminal to use at least one spatial beam to transmit the target SRS on the N OFDM symbols, where N is an integer greater than 1.

In a possible implementation, the target SRS includes one of the following: periodic SRS, semi-persistent SRS, or aperiodic SRS.

In a possible implementation, in a case that a repetition parameter in the configuration parameter is R, the configuration parameter indicates the terminal to use a same spatial beam on each R OFDM symbols of the N OFDM symbols to transmit the target SRS, wherein spatial beams used on every R OFDM symbols of the N OFDM symbols are different, and R is an integer greater than 0 and less than or equal to N.

In a possible implementation, in a case that a value of the repetition parameter is off, it is indicated that R=n, where n is a predetermined value, and n is an integer greater than 0 and less than or equal to N; or in a case that the configuration parameter does not include the repetition parameter, R=n; or it is prescribed in advance that the repetition parameter is configured to a value n.

In a possible implementation, in a case that a repetition parameter in the configuration parameter is configured to be on, the configuration parameter indicates the terminal to transmit the target SRS by using a same spatial beam on the N OFDM symbols; or in a case that the repetition parameter in the configuration parameter is configured to be off, the configuration parameter indicates the terminal to transmit the target SRS by using a different spatial beam on each OFDM symbol of the N OFDM symbols.

In a possible implementation, the first transmit module 1102 is further configured to transmit a trigger command for the target SRS to the terminal, where the trigger command carries the repetition parameter, and the target SRS is aperiodic SRS or semi-persistent SRS.

In a possible implementation, the trigger command is used to trigger P transmissions of the target SRS, and for each transmission of the P transmissions of the target SRS, a spatial beam used for transmitting the target SRS on the N OFDM symbols is determined according to the repetition parameter, where P is an integer greater than 0.

In a possible implementation, the configuration parameter further includes a start position of the N OFDM symbols in a slot.

In a possible implementation, a sum of M and N is less than or equal to 14, and the start position is the M-th OFDM symbol in the slot.

In a possible implementation, the number of spatial beams associated with the SRS resource is $m=\lfloor N/(R) \rfloor$.

In a possible implementation, the first transmit module 1102 is further configured to indicate, by using signaling, uplink spatial beam information selected for the SRS resource.

In a possible implementation, the signaling includes DCI signaling, and an SRS resource indication field in the DCI signaling indicates the uplink spatial beam information selected for the SRS resource.

In a possible implementation, the uplink spatial beam information includes one of the following: spatial relation information, transmission configuration indication information TCI, or identifier information of the spatial beam.

The SRS configuration apparatus provided in this embodiment of this application corresponds to the SRS configuration method provided in the embodiment of this application and has beneficial effects corresponding to the SRS configuration method. Details are not described herein again.

Figure 12:
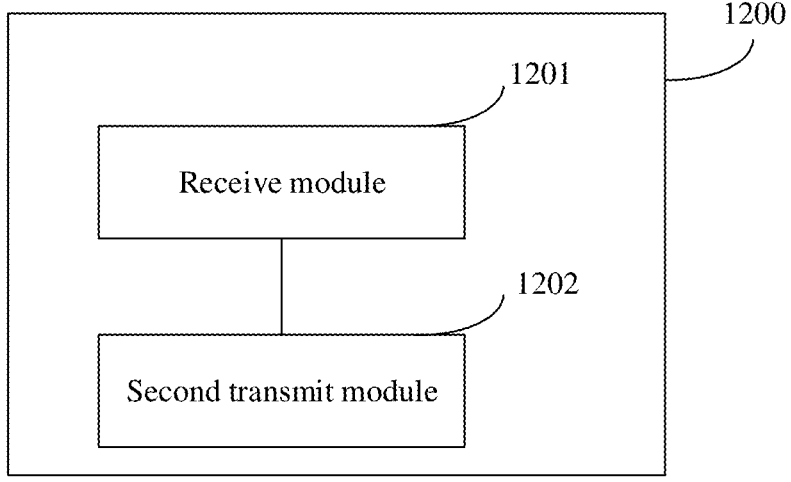
FIG. 12 is a schematic structural diagram of an SRS transmit apparatus according to an embodiment of this application.

FIG. 12 is a schematic structural diagram of an SRS transmit apparatus according to an embodiment of this application. As shown in FIG. 12, the apparatus 1200 may include a receive module 1201 and a second transmit module 1202.

In this embodiment of this application, the receive module 1201 is configured to receive a configuration parameter of a target SRS; and the second transmit module 1202 is configured to: in a case that an SRS resource indicated by the configuration parameter includes N OFDM symbols, and that the configuration parameter indicates that frequency hopping of the target SRS is disabled, transmit the target SRS by using at least one spatial beam on the N OFDM symbols, where N is an integer greater than 1.

In a possible implementation, the target SRS includes one of the following: periodic SRS, semi-persistent SRS, or aperiodic SRS.

In a possible implementation, the second transmit module 1202 transmitting the target SRS by using at least one spatial beam on the N OFDM symbols includes:

in a case that a repetition parameter in the configuration parameter is R, transmitting the target SRS by using a same spatial beam on each R OFDM symbols of the N OFDM symbols, wherein spatial beams used on every R OFDM symbols of the N OFDM symbols are different, and R is an integer greater than 0 and less than or equal to N.

In a possible implementation, in a case that the repetition parameter is configured to a value off, or that the configuration parameter does not include the repetition parameter, R=n, where n is a predetermined value, and n is an integer greater than 0 and less than or equal to N.

In a possible implementation, the second transmit module 1202 transmitting the target SRS by using at least one spatial beam on the N OFDM symbols includes:

in a case that a repetition parameter in the configuration parameter is configured to be on, transmitting, by the terminal, the target SRS by using a same spatial beam on the N OFDM symbols; or in a case that the repetition parameter in the configuration parameter is configured to be off, transmitting, by the terminal, the target SRS by using a different spatial beam on each OFDM symbol of the N OFDM symbols.

In a possible implementation, the receive module 1201 is further configured to:

before the terminal transmits the target SRS by using at least one spatial beam on the N OFDM symbols, receive a trigger command for the target SRS, where the trigger command carries the repetition parameter, and the target SRS is aperiodic SRS or semi-persistent SRS.

In a possible implementation, the trigger command is used to trigger P transmissions of the target SRS, and for each transmission of the P transmissions of the target SRS, the terminal determines, according to the repetition parameter, a spatial beam used for transmitting the target SRS on the N OFDM symbols, where P is an integer greater than 0.

In a possible implementation, the configuration parameter further includes a start position of the N OFDM symbols in a slot.

In a possible implementation, a sum of M and N is less than or equal to 14, and the start position is the M-th OFDM symbol in the slot.

In a possible implementation, the number of spatial beams associated with the SRS resource is $m=\lfloor N/R \rfloor$.

In a possible implementation, the receive module 1201 is further configured to receive downlink signaling, where the downlink signaling indicates uplink spatial beam information selected for the SRS resource; and the second transmit module 1202 determines, based on the uplink spatial beam information, a spatial beam used for transmitting the target SRS, and transmits the target SRS by using the determined spatial beam.

In a possible implementation, the downlink signaling includes DCI signaling, and an SRS resource indication field in the DCI signaling indicates the uplink spatial beam information selected for the SRS resource.

In a possible implementation, the uplink spatial beam information includes one of the following: spatial relation information, transmission configuration indication information TCI, or identifier information of the spatial beam.

The SRS transmit apparatus in this embodiment of this application may be an apparatus, or may be a component, an integrated circuit, or a chip in a terminal. Such apparatus may be a mobile terminal, or may be a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like. This is not specifically limited in the embodiments of this application.

The SRS transmit apparatus in this embodiment of this application may be an apparatus with an operating system. The operating system may be an Android operating system, may be an iOS operating system, or may be another possible operating system. This is not specifically limited in the embodiments of this application.

The SRS transmit apparatus provided in this embodiment of this application is capable of implementing various processes that are implemented by the terminal in the method embodiments of FIG. 2 to FIG. 10, with the same technical effects achieved. To avoid repetition, details are not described herein again.

Figure 13:
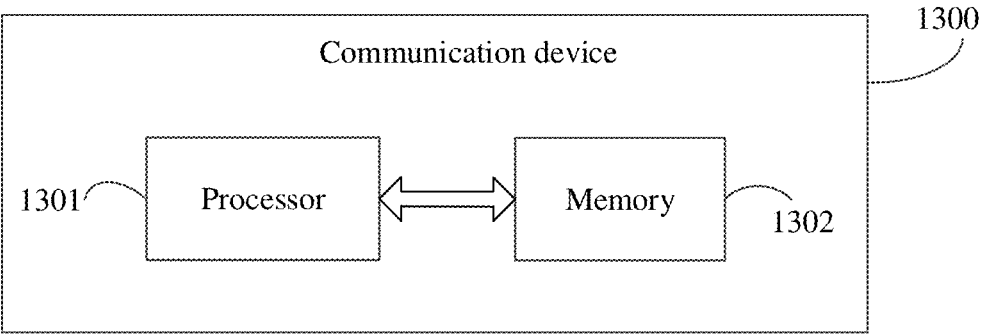
FIG. 13 is a schematic structural diagram of a communication device according to an embodiment of this application.

Optionally, as shown in FIG. 13, an embodiment of this application further provides a communication device 1300, including a processor 1301, a memory 1302, and a program or instructions stored in the memory 1302 and executable on the processor 1301. For example, in a case that the communication device 1300 is a terminal, when the program or instructions are executed by the processor 1301, the processes of the foregoing embodiment of the SRS transmit method are implemented, with the same technical effects achieved. In a case that the communication device 1300 is a network-side device, when the program or instructions are executed by the processor 1301, the processes of the foregoing embodiment of the SRS configuration method are implemented, with the same technical effects achieved. To avoid repetition, details are not described herein again.

Figure 14:
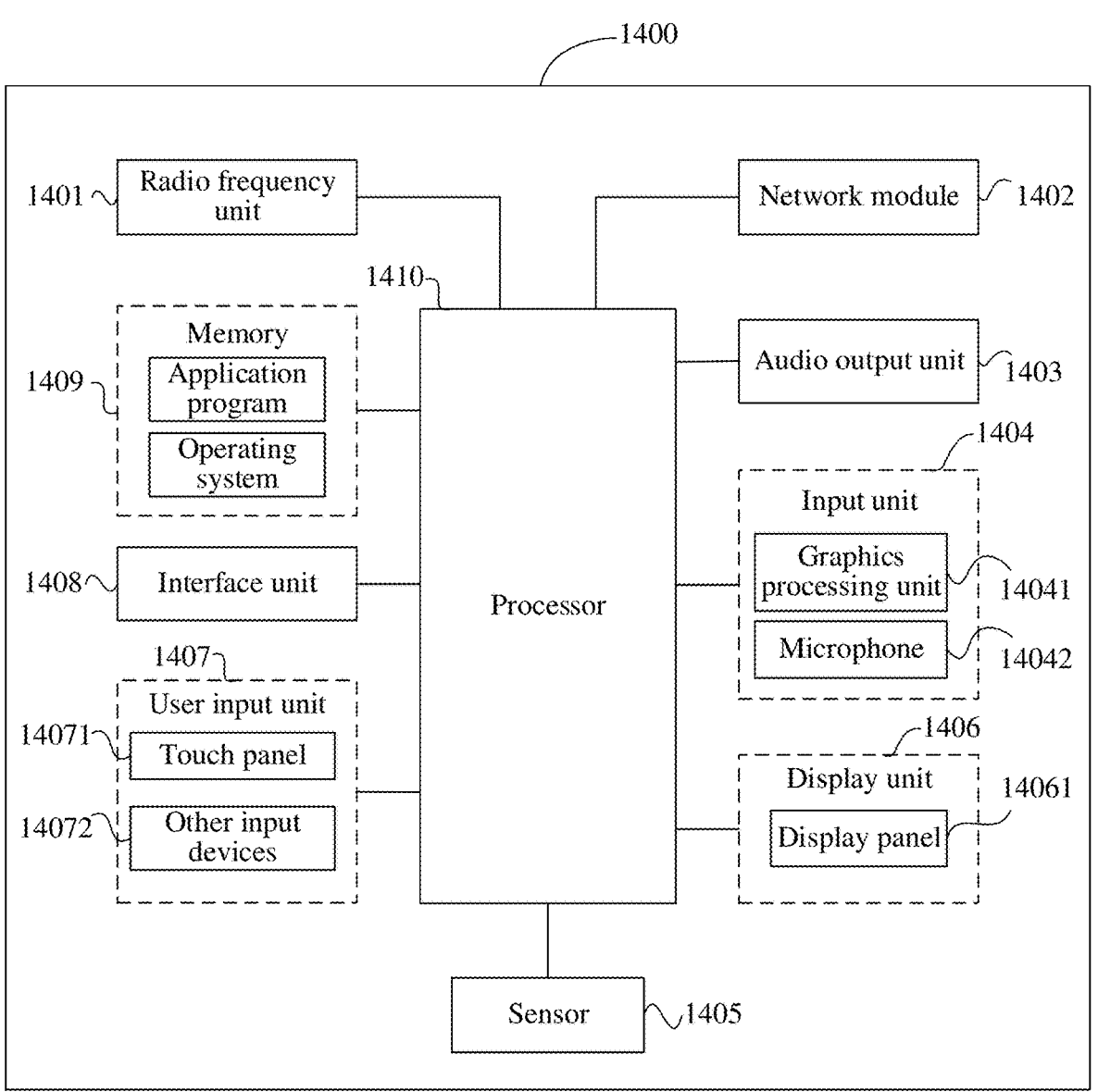
FIG. 14 is a schematic diagram of a hardware structure of a terminal according to an embodiment of this application.

FIG. 14 is a schematic diagram of a hardware structure of a terminal for implementing the embodiments of this application.

The terminal 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

Persons skilled in the art can understand that the terminal 1400 may further include a power supply (such as a battery) for supplying power to the components. The power supply may be logically connected to the processor 1410 through a power management system. In this way, functions such as charge management, discharge management, and power consumption management are implemented by using the power management system. The terminal structure shown in FIG. 14 does not constitute a limitation to the terminal. The terminal may include more or fewer components than shown in the figure, or a combination of some components, or components disposed differently. Details are not described herein again.

It should be understood that in this embodiment of this application, the input unit 1404 may include a graphics processing unit (GPU) 14041 and a microphone 14042. The graphics processing unit 14041 processes image data of a static picture or a video that is obtained by an image capture apparatus (for example, a camera) in a video capture mode or an image capture mode. The display unit 1406 may include a display panel 14061, and the display panel 14061 may be configured in a form of a liquid crystal display, an organic light-emitting diode display, or the like. The user input unit 1407 includes a touch panel 14071 and other input devices 14072. The touch panel 14071 is also referred to as a touchscreen. The touch panel 14071 may include two parts: a touch detection apparatus and a touch controller. The other input devices 14072 may include but are not limited to a physical keyboard, a functional button (such as a volume control button or a power on/off button), a trackball, a mouse, and a joystick. Details are not described herein.

In this embodiment of this application, the radio frequency unit 1401 transmits downlink information received from a network-side device to the processor 1410 for processing, and in addition, transmits uplink data to the network-side device. Generally, the radio frequency unit 1401 includes but is not limited to an antenna, at least one amplifier, a transceiver, a coupler, a low noise amplifier, and a duplexer.

The memory 1409 may be configured to store software programs or instructions and various data. The memory 1409 may mainly include a program or instruction storage area and a data storage area. The program or instruction storage area may store an operating system, an application program or instructions required by at least one function (for example, an audio playing function and an image playing function), and the like. In addition, the memory 1409 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash storage device, or another volatile solid-state storage device.

The processor 1410 may include one or more processing units. Optionally, the processor 1410 may integrate an application processor and a modem processor. The application processor mainly processes an operating system, a user interface, an application program or instructions, and the like. The modem processor mainly processes wireless communication, for example, a baseband processor. It should be understood that alternatively, the modem processor may not be integrated into the processor 1410.

The radio frequency unit 1401 is configured to: receive a configuration parameter of a target SRS; and in a case that an SRS resource indicated by the configuration parameter includes N OFDM symbols, and that the configuration parameter indicates that frequency hopping of the target SRS is disabled, transmit the target SRS by using at least one spatial beam on the N OFDM symbols, where N is an integer greater than 1.

The terminal provided in this embodiment of this application can implement the methods performed by the terminal in the method 200 and method 300, with the same technical effects achieved. To avoid repetition, details are not described herein again.

Figure 15:
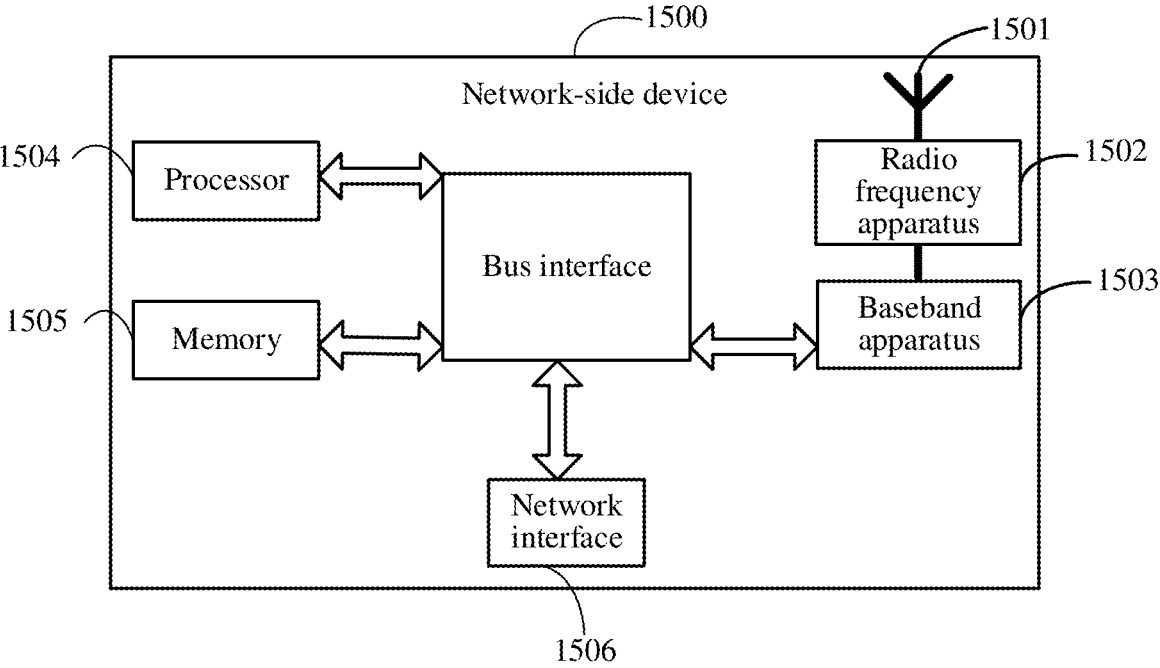
FIG. 15 is a schematic structural diagram of a hardware structure of a network-side device according to an embodiment of this application.

For example, an embodiment of this application further provides a network-side device. As shown in FIG. 15, the network-side device 1500 includes an antenna 1501, a radio frequency apparatus 1502, and a baseband apparatus 1503. The antenna 1501 is connected to the radio frequency apparatus 1502. In an uplink direction, the radio frequency apparatus 1502 receives information by using the antenna 1501, and transmits the received information to the baseband apparatus 1503 for processing. In a downlink direction, the baseband apparatus 1503 processes to-be-transmitted information, and transmits the information to the radio frequency apparatus 1502; and the radio frequency apparatus 1502 processes the received information and then transmits the information by using the antenna 1501.

The frequency band processing apparatus may be located in the baseband apparatus 1503. The method performed by the network-side device in the foregoing embodiments may be implemented by the baseband apparatus 1503, and the baseband apparatus 1503 includes a processor 1504 and a memory 1505.

The baseband apparatus 1503 may include, for example, at least one baseband processing unit, where a plurality of chips are disposed on the baseband processing unit. As shown in FIG. 15, one of the chips is, for example, the processor 1504, and connected to the memory 1505, to invoke the program in the memory 1505 to perform the operations of the network-side device shown in the foregoing method embodiments.

The baseband apparatus 1503 may further include a network interface 1506, configured to exchange information with the radio frequency apparatus 1502, where the interface is, for example, a common public radio interface (CPRI for short).

For example, the network-side device in this embodiment of the present application further includes instructions or a program stored in the memory 1505 and executable on the processor 1504. The processor 1504 invokes the instructions or program in the memory 1505 to perform the method performed by the modules shown in FIG. 11, with the same technical effects achieved. To avoid repetition, details are not described herein again.

An embodiment of this application further provides a non-transitory readable storage medium, where the non-transitory readable storage medium stores a program or instructions, and when the program or instructions are executed by a processor, the processes of the foregoing embodiments of the SRS configuration method are implemented, or the processes of the foregoing embodiments of the SRS transmit method are implemented, with the same technical effects achieved. To avoid repetition, details are not described herein again.

The processor is the processor in the terminal or the network-side device in the foregoing embodiment. The non-transitory readable storage medium includes a non-transitory computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement the processes of the foregoing embodiment of the SRS configuration method, or implement the processes of the foregoing embodiment of the SRS transmit method, with the same technical effects achieved. To avoid repetition, details are not described herein again.

A computer program product is provided. The computer program product includes a processor, a memory, and a program or instructions stored in the memory and executable on the processor. When the program or instructions are executed by the processor, the processes of the foregoing embodiment of the SRS configuration method are implemented, or the processes of the foregoing embodiment of the SRS transmit method are implemented, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such process, method, article, or apparatus. In absence of more constraints, an element defined by "including a . . . " does not exclude another same element in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A sounding reference signal configuration method, comprising:
indicating, by a network-side device to a terminal, a configuration parameter of a target sounding reference signal (SRS); wherein
in a case that an SRS resource indicated by the configuration parameter comprises N orthogonal frequency division multiplex (OFDM) symbols and the configuration parameter indicates that frequency hopping of the target SRS is disabled, the configuration parameter indicates the terminal to use at least one spatial beam to transmit the target SRS on the N OFDM symbols, wherein N is an integer greater than 1; wherein
in a case that a repetition parameter in the configuration parameter is R, the configuration parameter indicates the terminal to use a same spatial beam on each R OFDM symbols of the N OFDM symbols to transmit the target SRS, wherein spatial beams used among respective R OFDM symbols of the N OFDM symbols are different, and R is an integer greater than 0 and less than or equal to N;

or, in a case that the repetition parameter in the configuration parameter is configured to be on, the configuration parameter indicates the terminal to use a same spatial beam on the N OFDM symbols to transmit the target SRS; or in a case that the repetition parameter in the configuration parameter is configured to be off, the configuration parameter indicates the terminal to use a different spatial beam on each OFDM symbol of the N OFDM symbols to transmit the target SRS.

2. The method according to claim 1, wherein the target SRS comprises one of: periodic SRS, semi-persistent SRS, or aperiodic SRS.

3. The method according to claim 1, wherein a value of the repetition parameter being off, indicates that R equals to n, wherein n is a predetermined value, and n is an integer greater than 0 and less than or equal to N; or the configuration parameter not comprising the repetition parameter indicates that R equals to n; or the repetition parameter is configured to a value n as prescribed in advance.

4. The method according to claim 1, wherein the method further comprises:

in a case that the target SRS is aperiodic SRS or semi-persistent SRS, transmitting a trigger command for the target SRS to the terminal, wherein the trigger command carries the repetition parameter.

5. The method according to claim 4, wherein the trigger command is used to trigger P transmissions of the target SRS, and for each transmission of the P transmissions of the target SRS, a spatial beam used for transmitting the target SRS on the N OFDM symbols is determined according to the repetition parameter, wherein P is an integer greater than 0.

6. The method according to claim 1, wherein the configuration parameter further comprises a start position of the N OFDM symbols in a slot.

7. The method according to claim 6, wherein a sum of M and N is less than or equal to 14, and the start position is the M-th OFDM symbol in the slot.

8. The method according to claim 1, wherein a number of spatial beams associated with the SRS resource is m which equals to $\lfloor N/R \rfloor$.

9. The method according to claim 1, wherein the method further comprises:

indicating, by the network-side device by using signaling, uplink spatial beam information selected for the SRS resource.

10. The method according to claim 9, wherein the signaling comprises downlink control information (DCI) signaling, and an SRS resource indication field in the DCI signaling indicates the uplink spatial beam information selected for the SRS resource.

11. The method according to claim 10, wherein the uplink spatial beam information comprises one of: spatial relation information, transmission configuration indication information (TCI), or identifier information of the spatial beam.

12. A network-side device, comprising a processor, a memory, and a program or instructions stored in the memory and executable on the processor, wherein the program or instructions, when executed by the processor, cause the network-side device to perform:

indicating a configuration parameter of a target sounding reference signal (SRS) to a terminal; wherein in a case that an SRS resource indicated by the configuration parameter comprises N orthogonal frequency division multiplex (OFDM) symbols and the configuration parameter indicates that frequency hopping of the target SRS is disabled, the configuration parameter indicates the terminal to use at least one spatial beam to transmit the target SRS on the N OFDM symbols, wherein N is an integer greater than 1; wherein in a case that a repetition parameter in the configuration parameter is R, the configuration parameter indicates the terminal to use a same spatial beam on each R OFDM symbols of the N OFDM symbols to transmit the target SRS, wherein spatial beams used among respective R OFDM symbols of the N OFDM symbols are different, and R is an integer greater than 0 and less than or equal to N;

or, in a case that a repetition parameter in the configuration parameter is configured to be on, the configuration parameter indicates the terminal to use a same spatial beam on the N OFDM symbols to transmit the target SRS; or in a case that a repetition parameter in the configuration parameter is configured to be off, the configuration parameter indicates the terminal to use a different spatial beam on each OFDM symbol of the N OFDM symbols to transmit the target SRS.

13. The network-side device according to claim 12, wherein the target SRS comprises one of: periodic SRS, semi-persistent SRS, or aperiodic SRS.

14. The network-side device according to claim 12, wherein a value of the repetition parameter being off, indicates that R equals to n, wherein n is a predetermined value, and n is an integer greater than 0 and less than or equal to N; or the configuration parameter not comprising the repetition parameter indicates that R equals to n; or the repetition parameter is configured to a value n as prescribed in advance.

15. The network-side device according to claim 12, wherein the program or instructions, when executed by the processor, cause the network-side device to further perform:

in a case that the target SRS is aperiodic SRS or semi-persistent SRS, transmitting a trigger command for the target SRS to the terminal, wherein the trigger command carries the repetition parameter.

16. A terminal, comprising a processor, a memory, and a program or instructions stored in the memory and executable on the processor, wherein the program or instructions, when executed by the processor, cause the terminal to perform:

receiving a configuration parameter of a target sounding reference signal (SRS); wherein in a case that an SRS resource indicated by the configuration parameter comprises N orthogonal frequency division multiplex (OFDM) symbols and the configuration parameter indicates that frequency hopping of the target SRS is disabled, transmitting the target SRS by using at least one spatial beam on the N OFDM symbols, wherein N is an integer greater than 1;

wherein the program or instructions, when executed by the processor, cause the terminal to perform:

in a case that a repetition parameter in the configuration parameter is R, transmitting the target SRS by using a same spatial beam on each R OFDM symbols of the N OFDM symbols, wherein spatial beams used among respective R OFDM symbols of the N OFDM symbols are different, and R is an integer greater than 0 and less than or equal to N;

or, wherein the program or instructions, when executed by the processor, cause the terminal to perform:

in a case that the repetition parameter in the configuration parameter is configured to be on, transmitting the target SRS by using a same spatial beam on the N OFDM symbols; or in a case that the repetition parameter in the configuration parameter is configured to be off, transmitting the target SRS by using a different spatial beam on each OFDM symbol of the N OFDM symbols.

17. The terminal according to claim 16, wherein the target SRS comprises one of: periodic SRS, semi-persistent SRS, or aperiodic SRS.

18. The terminal according to claim 16, wherein the program or instructions, when executed by the processor, cause the terminal to further perform:

in a case that the target SRS is aperiodic SRS or semi-persistent SRS, receiving a trigger command for the target SRS, wherein the trigger command carries the repetition parameter.

19. The terminal according to claim 16, wherein configuration parameter further comprises a start position of the N OFDM symbols in a slot.

20. The terminal according to claim 16, wherein a number of spatial beams associated with the SRS resource is m which equals to $\lfloor N/R \rfloor$.

\* \* \* \* \*